(12) United States Patent
Schlienger et al.

(10) Patent No.: US 7,329,090 B2
(45) Date of Patent: Feb. 12, 2008

(54) SPRING CLAMPING CLIP

(75) Inventors: Joel Schlienger, Zürich (CH); Adrian Kopp, Kirchdorf (CH)

(73) Assignee: ABB Turbo Systems AG, Baden (CH)

( * ) Notice: Subject to any disclaimer, the term of this patent is extended or adjusted under 35 U.S.C. 154(b) by 167 days.

(21) Appl. No.: 11/225,088

(22) Filed: Sep. 14, 2005

(65) Prior Publication Data
US 2006/0073020 A1 Apr. 6, 2006

(30) Foreign Application Priority Data
Sep. 21, 2004 (EP) .................. 04405605

(51) Int. Cl.
B64C 11/04 (2006.01)

(52) U.S. Cl. .................. 415/159; 415/160

(58) Field of Classification Search .......... 416/204 R, 416/500; 415/159, 160, 165, 185, 191, 204, 415/205
See application file for complete search history.

(56) References Cited

U.S. PATENT DOCUMENTS 4,836,747 A * 6/1989 Hotz .................. 415/160
5,211,537 A * 5/1993 Langston et al. ......... 415/209.2
5,415,272 A * 5/1995 Boschert et al. ........... 198/780
5,518,332 A * 5/1996 Katoh .................. 403/155
5,518,365 A * 5/1996 Baets et al. ................ 415/160

FOREIGN PATENT DOCUMENTS

DE  43 09 636 A1  9/1994
EP  0 226 444  6/1987

OTHER PUBLICATIONS

German language Office Action citing US Patent No. 5,415,272.

* cited by examiner

Primary Examiner—Igor Kershteyn
(74) Attorney, Agent, or Firm—Buchanan Ingersoll & Rooney PC

(57) ABSTRACT

The use of spring clamping clips between two adjacent guide vane shafts leads to a defined force on the bearing points of the guide vane in the guide bush. The seating force, resulting from the clamping force and the flow-related lift/drift forces, of the guide vane in the guide bush is therefore always positive and the guide vane rests constantly in the guide bush.

21 Claims, 2 Drawing Sheets

SPRING CLAMPING CLIP

DESCRIPTION

1. Technical Field

The invention relates to radial-flow exhaust turbocharger turbines having individually adjustable guide vanes which are each adjustable via a respective guide vane shaft mounted in a housing, each guide vane shaft being actuated via a pivoted lever. The invention relates to a guide arrangement of a turbomachine having rotatably mounted guide vanes and a spring clamping clip for mutually restraining the guide vane shafts and to an exhaust turbocharger having such a guide arrangement.

2. Prior Art

Exhaust turbines, in particular in exhaust turbochargers, are used in combination with an internal combustion engine. The exhaust gas from the internal combustion engine is used as driving medium for driving the turbine wheel. The turbine wheel is connected by a shaft to the compressor wheel, with which the intake air which is fed to the internal combustion engine is compressed. Instead of a fixed flow cascade (nozzle ring), it has in the meantime become normal practice to use variable turbine geometries (VTG). In this case, the incident angles of turbine guide vanes can be adapted to the respective operating point by an adjusting mechanism.

As a rule, a VTG arrangement comprises a plurality of guide vanes mounted in a bearing housing on shafts and an adjusting mechanism for rotating the guide vanes. VTG arrangements are described, for instance, in EP 0 226 444 or DE 43 09 636.

The guide vanes of an exhaust turbine, which are heated to a very pronounced extent during operation, must be installed in the bearing bushes with suitable clearance, so that they do not jam. The clearance, at the radial bearing points of the guide vanes, may sometimes lead to vibration fretting at the seating surfaces between the guide vane shaft and the bearing bushes, which fretting may be caused, for example, by operation-induced vibrations of the bearing housing or by variable flow forces.

U.S. Pat. No. 5,415,272 discloses an arrangement having a spring clamping clip which is arranged between a pair of nonrotating roller shafts and is intended for damping the vibration of a roller conveyor.

BRIEF SUMMARY OF THE INVENTION

The object of the invention is to improve a bearing arrangement of guide vane shafts in such a way that less wear occurs at the bearing points.

This object is achieved by means of spring clamping clips which are clamped between the shafts, so that the seating forces of the shafts are increased in a certain direction, and the undefined movements of the guide vane shaft in the bearing bush, which are caused, for example, in an exhaust turbine by the housing vibrations or flow forces, are prevented.

The use of spring clamping clips between two guide vane shafts leads to a defined force on the bearing points in the circumferential direction. This achieves the effect that seating forces resulting from the clamping force and variable flow forces always remain positive and the guide vanes rest constantly in the guide bushes despite the vibrations of the housing.

The spring clamping clip is designed according to the invention in such a way that, on the one hand, it does not fall off the guide vane shafts during operation and, on the other hand, can be fitted without having to dismantle the VTG arrangement.

The spring clamping clips can be installed in existing turbomachines, for example the turbine of an exhaust turbocharger, so that the future wear of the guide vane bearings can be reduced in a simple manner.

Further advantages follow from the dependent claims.

BRIEF DESCRIPTION OF THE DRAWINGS

The invention is explained in more detail below with reference to the figures. In the drawing.

WAY OF IMPLEMENTING THE INVENTION

Figure 2:
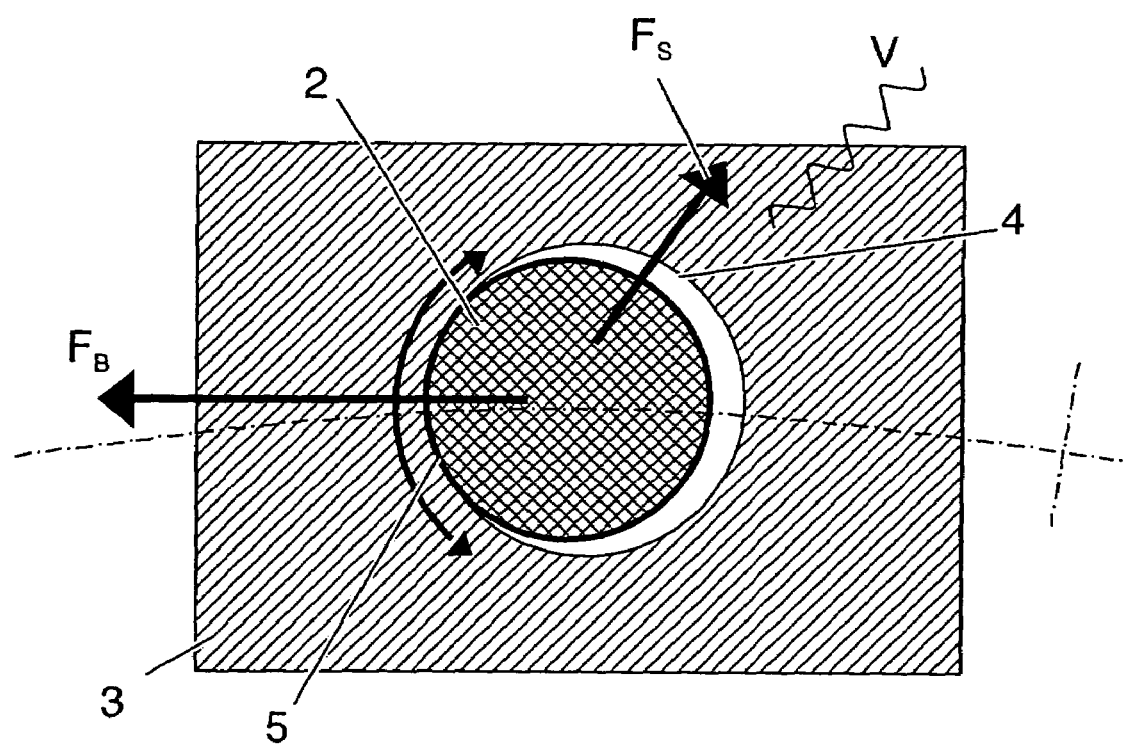
FIG. 2 shows a schematic illustration of the forces acting on the guide vane shaft mounted in a bearing bush.

FIG. 2 schematically shows the forces acting on a guide vane shaft restrained according to the invention with a spring clamping clip. The clamping clip force $F_B$ exerted by the spring clamping clip and acting in the circumferential direction (circumferential direction of the exhaust turbine, shown by the curved, dot-dash line) results in a positive seating force irrespective of the flow forces $F_S$ and the housing vibrations V, i.e. the guide vane shaft 2 always rests in the guide bush 4 and cannot lift. The center point of the guide vane shaft is displaced in the circumferential direction by the clamping clip force $F_B$ until said guide vane shaft runs against the bearing bush. The seating point 5 of the guide vane shaft, with different flow forces $F_S$, is displaced smoothly along the contour of the bearing bush as a function of the different operating points thanks to the clamping clip force $F_B$. This effect provides for a reduction in the wear at the guide vane shaft and/or the bearing bush, since the location of maximum surface pressure spreads out along the contact contour. The material is subjected to considerably less stress in section, a factor which leads to an increase in the service life of the guide vane bearings and thus of the entire VTG arrangement.

The spring clamping clip is placed radially from outside between two guide vane shafts in order to apply a defined clamping clip force to the shaft bearings in the circumferential direction. Due to the shaping according to the invention of the clip ends, no dismantling of the VTG arrangement is necessary for this assembly step. As a result, servicing is greatly simplified and can be carried out, for example, directly in the field, i.e. on the fitted turbocharger. The spring clamping clip can also be pushed onto the guide vanes radially from the inside.

Figure 1:
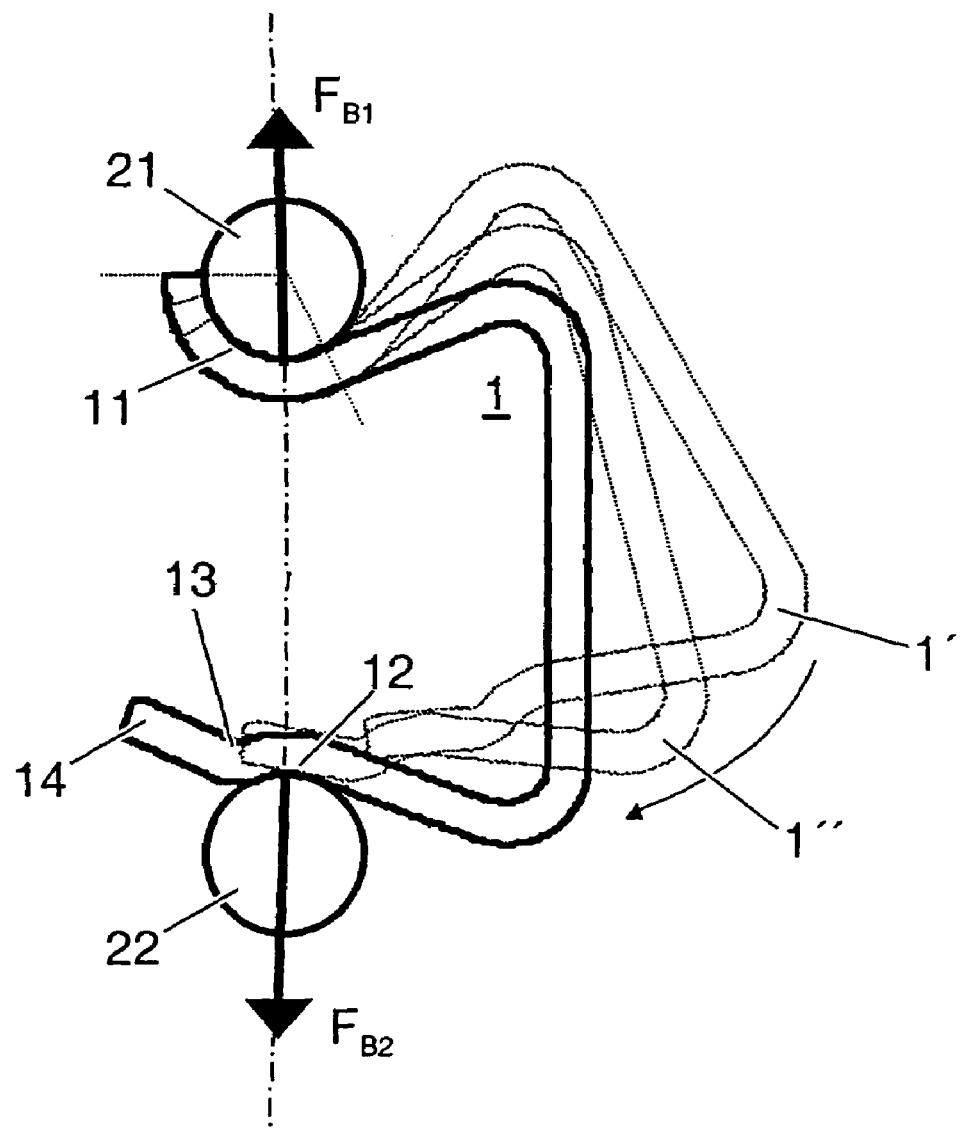
FIG. 1 shows a spring clamping clip in the state fitted according to the invention between two guide vane shafts.

In the region of the top end, the spring clamping clip 1 shown in its fitted form in FIG. 1 has a seating region 11 drawn partly along the shaft contour up to an angle of about 120°. This partial enclosure of the shaft largely prevents the spring clamping clip from falling off during operation of the exhaust turbine and in particular during the adjustment of the guide vanes when the guide vane shafts rotate about their own axis. In the region of the bottom end, the spring clamping clip likewise has a seating region 12 drawn partly along the shaft contour. The two seating regions 11 and 12 may be drawn along the contour of the corresponding shaft to the same extent or to a different extent.

The bottom end of the spring clamping clip is shaped in such a way that it can engage on the shaft circumference of the bottom guide vane shaft in a sliding manner. This fitting aid is realized with a curvature 13 running against the force exerted on the shaft by this bottom end during the restraining of the spring clamping clip. That is to say that the curvature 13 at the end of the spring clamping clip is oriented in a different direction from the curvature of the bottom seating region 12. As can be seen from the figure, a short, straight piece 14 may also be formed following the curvature, this straight piece 14 making it even easier to "thread" the spring clamping clip between the shafts during the fitting.

The fitting sequence may be explained with reference to FIG. 1. The spring clamping clip is first of all directed perpendicularly to the top shaft 21 with the top seating region to the shaft (shown by position 1') and is then pressed in the direction of the bottom shaft in the arrow direction by a rotary movement about the top shaft center (position 1"). With the bottom end, the spring clamping clip is then pressed over the second shaft 22 until its bottom seating region latches in place on the shaft in its definitive position (depicted by thick bordering lines).

The elastic element of the spring clamping clip is arranged between the two seating regions 11 and 12. This involves a double bend in the exemplary embodiment shown. Depending on the requirements for the spring force to be exerted on the shafts, other forms of spring elements may be provided, for example an individual arc of a circle, or even a spiral spring.

As an alternative to the spring clamping clip shown, which is pushed into place between two shafts, the wear-reducing bearing load according to the invention can also be realized with a spring clamping clip which can be pushed onto and encloses two shafts. In this case, the seating surfaces are bent inward toward the shafts, and the clamping clip presses the two shafts together in the circumferential direction, instead of pushing them apart.

In addition, the spring clamping clip according to the invention may also be used for restraining a single shaft relative to a housing projection or a journal mounted in a nonrotatable manner.

In the application of the guide arrangement of an exhaust turbine having a plurality of shafts arranged in a circle, two adjacently arranged shafts or else two shafts with one or more shafts lying in between can be restrained relative to one another with the spring clamping clip according to the invention. The angle of the clamping clip forces exerted on the two shafts can be varied via the distance between the shafts restrained relative to one another.

In order to prevent abrasion at the interfaces between spring clamping clip and guide vane shaft, which can be caused by the friction produced by the clamping clip force on the shaft, the spring clamping clip may be provided with an anti-wear coating (a coating having a low coefficient of friction and/or low abrasion) at least in the seating regions. Of course, the shaft, in the region which is in contact with the spring clamping clip, may also be coated, or a wear-free intermediate layer, for instance in the form of a cap which can be slipped onto the spring clamping clip or the shaft, may be arranged between the spring clamping clip and the shaft.

| List of designations | |
|---|---|
| 1 | Spring clamping clip |
| 11, 12 | Seating region |
| 13 | Fitting-aid curvature |
| 14 | End extension |
| 21, 22 | Guide vane shaft |
| 3 | Bearing housing |
| 4 | Shaft bearing bush |
| 5 | Seating point of the guide vane shaft in the bearing bush |
| $F_{B1}, F_{B2}$ | Clamping clip force |
| $F_S$ | Flow force |
| L | Clip width |
| M | Clip length |
| V | Vibration movements |

What is claimed is:

1. A guide arrangement of a turbomachine, comprising a plurality of guide vanes arranged on rotatably mounted guide vane shafts, wherein two respective guide vane shafts are restrained by means of a spring clamping clip, the spring clamping clip having a respective shaft seating region for accommodating a respective guide vane shaft, and, during the restraint, the elastically deformable spring clamping clip, in the area of the two seating regions, produces two opposed forces in the direction of the restrained guide vane shafts.

2. The guide arrangement of a turbomachine, comprising at least one guide vane arranged on a rotatably mounted guide vane shaft, wherein the guide vane shaft is restrained against a housing part by means of a spring clamping clip, the spring clamping clip having a shaft seating region for accommodating the guide vane shaft and a housing seating region for accommodating the housing part, and, during the restraint, the elastically deformable spring clamping clip, in the area of the two seating regions, produces two opposed forces in the direction of the restrained guide vane shaft on the one hand and in the direction of the housing part on the other hand.

3. The guide arrangement as claimed in claim 1, wherein the seating regions are designed to be curved in opposite directions.

4. The guide arrangement as claimed in claim 1, wherein the spring clamping clip and/or the guide vane shaft are/is provided with an anti-wear coating, and/or an anti-wear coating is arranged between spring clamping clip and guide vane shaft.

5. The guide arrangement as claimed in claim 4, wherein the seating regions are coated with an anti-wear coating.

6. An exhaust turbocharger, comprised by a guide arrangement as claimed in claim 1.

7. A spring clamping clip for mutual restraint of two shafts arranged parallel to one another and at a distance from one another, wherein the spring clamping clip has two shaft seating regions for accommodating a respective shaft and, during the restraint, the elastically deformable spring clamping clip, in the area of the two seating regions, produces two opposed forces in the direction of the shafts to be restrained, a first shaft seating region formed to match a shaft contour at less than or equal to 120° and a second shaft seating region formed to match a shaft contour.

8. The spring clamping clip as claimed in claim 7, wherein the shaft seating regions are designed to be curved in opposite directions.

9. The spring clamping clip as claimed in claim 7, wherein, in the area around at least one of the two shaft seating regions, the spring clamping clip comprises means for fitting the spring clamping clip between two shafts to be restrained relative to one another.

10. The spring clamping clip as claimed in claim 9, wherein that the means for fitting the spring clamping clip comprise a fitting-aid region which comprises a curvature directed against the force produced in this shaft seating region during the restraint of the spring clamping clip.

11. The spring clamping clip as claimed in claim 7, wherein the seating regions are coated with an anti-wear coating.

12. A shaft bearing arrangement, comprising two shafts mounted parallel to one another and at a distance from one another, wherein the two shafts are restrained relative to one another by means of a spring clamping clip as claimed in claim 7.

13. The guide arrangement as claimed in claim 2, wherein the seating regions are designed to be curved in opposite directions.

14. The guide arrangement as claimed in claim 2, wherein the spring clamping clip and/or the guide vane shaft are/is provided with an anti-wear coating, and/or an anti-wear coating is arranged between spring clamping clip and guide vane shaft.

15. The guide arrangement as claimed in claim 3, wherein the spring clamping clip and/or the guide vane shaft are/is provided with an anti-wear coating, and/or an anti-wear coating is arranged between spring clamping clip and guide vane shaft.

16. An exhaust turbocharger, comprised by a guide arrangement as claimed in claim 2.

17. An exhaust turbocharger, comprised by a guide arrangement as claimed in claim 3.

18. An exhaust turbocharger, comprised by a guide arrangement as claimed in claim 4.

19. An exhaust turbocharger, comprised by a guide arrangement as claimed in claim 5.

20. A spring clamping clip for mutual restraint of two shafts arranged parallel to one another and at a distance from one another, wherein the spring clamping clip has a respective shaft seating region for accommodating a respective shaft and, during the restraint, the elastically deformable spring clamping clip, in the area of the two seating regions, produces two opposed forces in the direction of the shafts to be restrained, wherein the seating regions are coated with an anti-wear coating.

21. A shaft bearing arrangement, comprising two shafts mounted parallel to one another and at a distance from one another, wherein the two shafts are restrained relative to one another by means of a spring clamping clip as claimed in claim 20.

* * * * *